(12) United States Patent
Grybush

(10) Patent No.: US 7,886,706 B2
(45) Date of Patent: Feb. 15, 2011

(54) ENGINE STARTING SYSTEM

(75) Inventor: Anthony F. Grybush, Kiel, WI (US)

(73) Assignee: Certified Parts Corporation, Janesville, WI (US)

( * ) Notice: Subject to any disclaimer, the term of this patent is extended or adjusted under 35 U.S.C. 154(b) by 0 days.

(21) Appl. No.: 12/200,204

(22) Filed: Aug. 28, 2008

(65) Prior Publication Data

US 2009/0064957 A1 Mar. 12, 2009

Related U.S. Application Data

(60) Provisional application No. 60/970,326, filed on Sep. 6, 2007.

(51) Int. Cl.
F02N 11/00 (2006.01)
F02N 15/02 (2006.01)

(52) U.S. Cl. .............................. 123/179.24; 123/179.25; 290/38 R

(58) Field of Classification Search .................. 70/237, 70/255; 74/6, 7 R; 123/179.25, 179.28, 123/198 B, 179.24; 290/1 A, 38 C, 38 E, 290/38 R
See application file for complete search history.

(56) References Cited

U.S. PATENT DOCUMENTS

| 2,838,938 | A | | 6/1958 | Sacchini et al. | |
|---|---|---|---|---|---|
| 2,865,358 | A | | 12/1958 | Musgrace | |
| 2,939,448 | A | | 6/1960 | Hansen | |
| 3,500,085 | A | | 3/1970 | Smith | |
| 3,526,146 | A | | 9/1970 | Harkness | |
| 3,536,051 | A | | 10/1970 | Hamman | |
| 3,625,071 | A | | 12/1971 | Harkness | |
| 3,696,593 | A | * | 10/1972 | Thorud et al. | ................ 56/17.5 |
| 3,980,068 | A | * | 9/1976 | Karsten et al. | ........ 123/198 DC |
| 4,107,484 | A | * | 8/1978 | Petersen, III | ............. 200/43.04 |
| 4,155,420 | A | * | 5/1979 | Staver | ........................ 180/287 |
| 4,362,065 | A | * | 12/1982 | Baratti | ......................... 74/7 A |
| 4,507,566 | A | | 3/1985 | Leatherman et al. | |
| 4,636,651 | A | * | 1/1987 | Kilgore | ..................... 307/10.3 |
| 4,695,735 | A | * | 9/1987 | Tallis et al. | ............... 290/38 R |
| 4,718,290 | A | | 1/1988 | Murata et al. | |
| 4,870,811 | A | * | 10/1989 | Steele | ........................ 56/10.5 |
| 4,887,476 | A | * | 12/1989 | Yokoyama | ..................... 74/7 E |
| 4,930,467 | A | | 6/1990 | Masuda et al. | |
| 5,010,858 | A | | 4/1991 | Schierling et al. | |
| 5,159,845 | A | | 11/1992 | Wada et al. | |
| 5,301,494 | A | * | 4/1994 | Peot et al. | ..................... 56/10.5 |

(Continued)

Primary Examiner—Stephen K Cronin
Assistant Examiner—David Hamaoui
(74) Attorney, Agent, or Firm—Boyle Fredrickson, S.C.

(57) ABSTRACT

An internal combustion engine including an electrical starting system which integrates several components into a single assembly for easier manufacture and operation of the engine. For example, a safety switch and key are integrated with the electric motor starting system. The starting system includes a starter motor having a drive member in selective driving relationship with the engine crankshaft, and also includes a key and a switch assembled to the starter motor. The switch includes a power connector and a key interface, and the key and key interface are together moveable between a first or "insert/remove" position in which the key is selectively engageable and disengageable with the key interface, a second or "run" position in which the key is engaged with the key interface and the power connector is not in electrical communication with the starter motor, and a third or "start" position in which the key is engaged with the key interface and the power connector is in electrical communication with the starter motor.

6 Claims, 9 Drawing Sheets

U.S. PATENT DOCUMENTS

| | | |
|---|---|---|
| 5,351,565 A | 10/1994 | Wada et al. |
| 5,720,247 A * | 2/1998 | Suzuki et al. .......... 123/179.25 |
| 6,018,937 A * | 2/2000 | Shimada et al. .............. 56/10.5 |
| 6,054,777 A * | 4/2000 | Soh .......................... 290/38 R |
| 6,240,889 B1 | 6/2001 | Kuwabara et al. |
| 6,374,791 B1 * | 4/2002 | Kuwabara et al. ...... 123/179.25 |
| 6,918,802 B2 * | 7/2005 | Watabe et al. ................. 440/85 |
| 7,071,436 B2 * | 7/2006 | Coates ....................... 200/341 |
| 2001/0048246 A1 * | 12/2001 | Shamoto et al. ............. 307/10.6 |
| 2009/0020093 A1 * | 1/2009 | Kaneda et al. ......... 123/179.25 |

\* cited by examiner

FIG_1
PRIOR ART

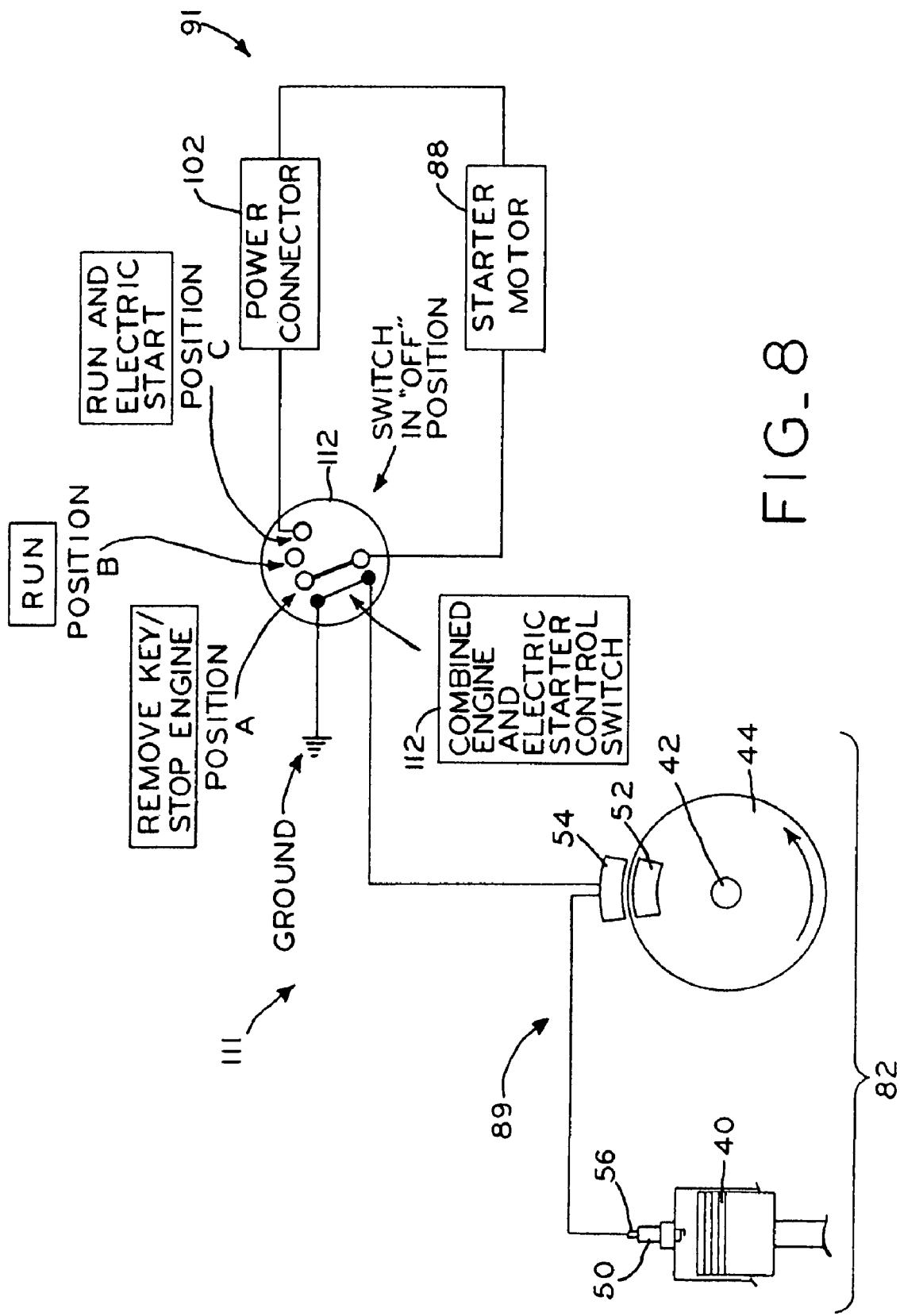
FIG_8

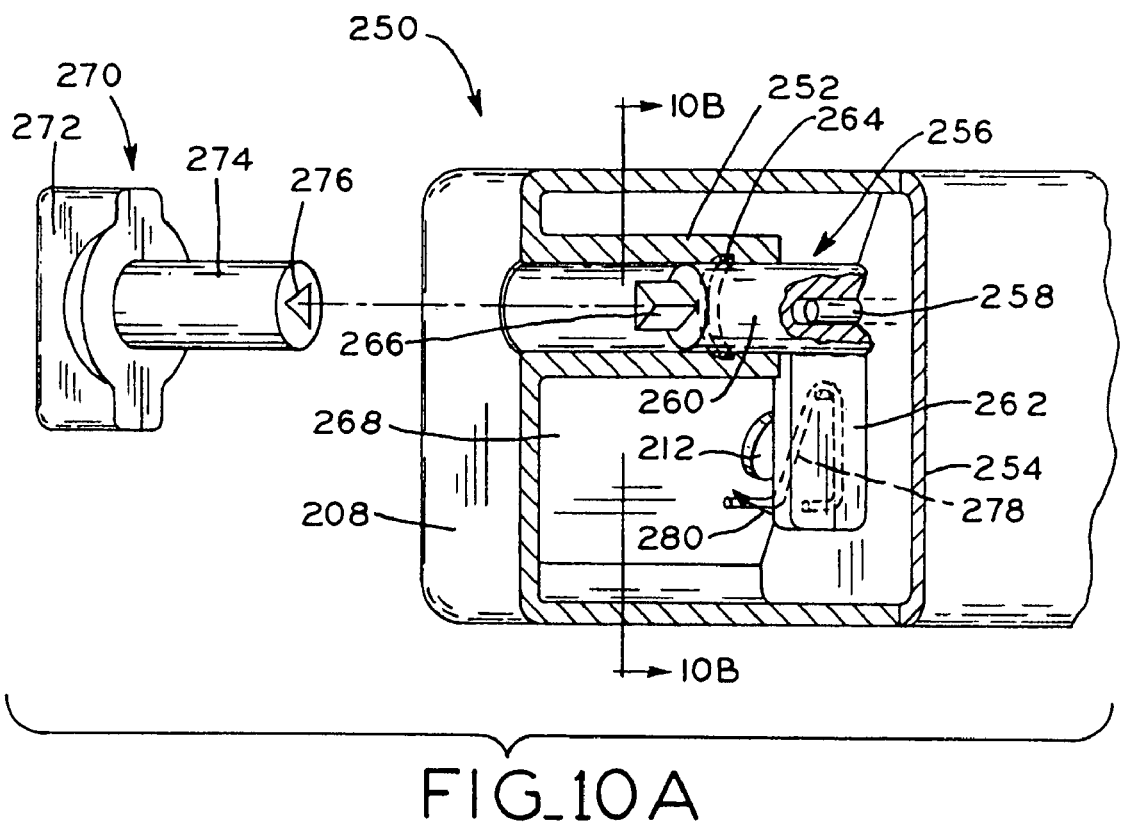
FIG_10A
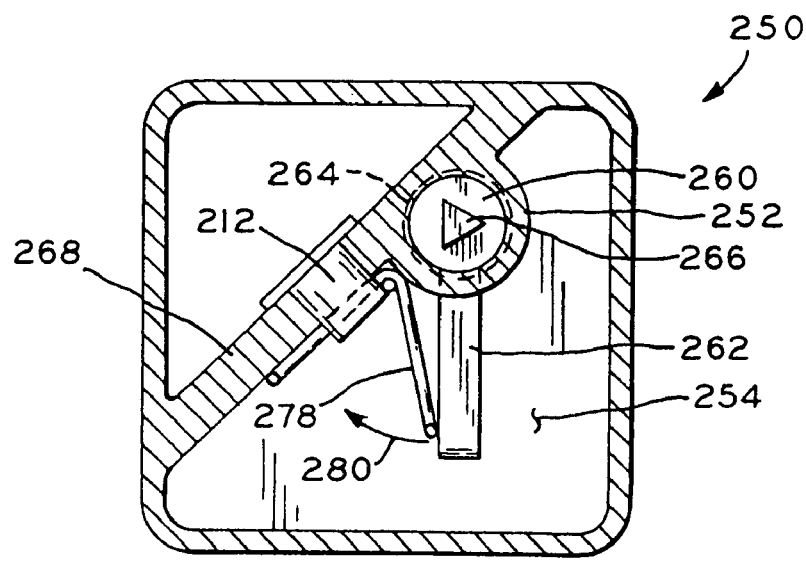
FIG_10B

ENGINE STARTING SYSTEM

CROSS-REFERENCE TO RELATED APPLICATIONS

This application claims the benefit under Title 35, U.S.C. §119(e) of U.S. Provisional Application Ser. No. 60/970,326, entitled ENGINE STARTING SYSTEM, filed on Sep. 6, 2007, the disclosure of which is expressly incorporated by reference herein.

BACKGROUND OF THE INVENTION

1. Field of the Invention

The present invention relates to starting systems for small internal combustion engines of the type used with lawnmowers, lawn tractors, snow throwers, generators, and other utility implements. In particular, the present invention relates to an electrical engine starting system that includes a starter motor powered by an external power source.

2. Description of the Related Art

Small internal combustion engines include starting systems which may be manually-actuated systems, such as manual recoil starters, or electrically-actuated systems which include a starter motor. Some small internal combustion engines may include both of the foregoing types of starting systems to allow operation of the engine where electrical power is either available or unavailable and/or to provide the operator with the option of either manual or electric starting.

Referring to FIGS. 1 and 2, an exemplary implement 20 is shown in the form of a snow thrower, which includes an engine 22 having a starting system 24 of the type shown in FIG. 2. Snow thrower 20 generally includes a frame or deck 26 to which engine 22 is mounted, and handle 28 extending from deck 26 which may be grasped by an operator to move snow thrower 20. Snow thrower 20 may optionally include a transmission (not shown) for driving wheels 30. Engine 22 drives an impeller mechanism (not shown) associated with an intake scoop 32 and a discharge chute 34 through which snow is discharged by the impeller mechanism.

Referring additionally to FIG. 2, engine 22 generally includes crankcase 36 to which one or more cylinders 38 are attached. A piston 40 in each cylinder drives crankshaft 42 which is rotatably supported by bearings within crankcase 36. Engine 22 additionally includes an intake system with a carburetor or a fuel injection device (not shown) supplied by fuel from a fuel tank (not shown), as well as an exhaust system (not shown) including a muffler and/or a catalytic converter (not shown). A flywheel 44 is secured for rotation on an end of crankshaft 42 which extends externally of crankcase 36, and may include a toothed ring gear that is engaged and rotated by the starting system 64 to crank crankshaft 42 for starting engine 22 in the manner described below.

Engine 22 may include a known, manually-operated recoil starter mechanism 46 associated with flywheel 44 and crankshaft 42, including a recoil starter handle attached to a rope of the recoil starter mechanism which may be pulled to engage the mechanism with flywheel 44 to manually rotate flywheel 44 and crankshaft 42 for starting engine 22.

Engine 22 also includes ignition circuit 48 which is operable during running of engine 22 to provide ignition pulses to spark plug(s) 50 of to initiate combustion within engine cylinder(s) 38. Typically, a permanent magnet 52 is fixed for rotation with flywheel 44 of engine crankshaft 42, and passes by a fixed magneto 54 during each crankshaft revolution to generate an electrical pulse that is conducted to spark plug 50 via lead 56 to fire spark plug 50 within the combustion chamber of engine cylinder 38. Many small internal combustion engines further include an engine shutdown or control switch 58, commonly referred to as a "kill" switch, which grounds ignition circuit 48 to terminate operation of engine 22. On some engines, engine control switch 58 may be coupled to a manually-actuable member, such as a bail assembly on the implement handle that is grasped by the operator for engine starting and running and is released by the operator for engine shutdown. On other engines, engine control switch 58 may be provided as a separate, manually-controlled switch that may be integrated with the throttle control device of the engine.

One known starting system for use with engine 22 having an ignition circuit 48 of the type described above includes a remote safety key 60 that is inserted into safety key switch 62 to enable ignition circuit 48. Ignition circuit 48 is grounded and disabled when safety key 60 is removed from safety key switch 62. Engine 22 additionally includes both a manually operable recoil starter 46 and an electric starter assembly 64 for starting the engine. The electric starter assembly 64 includes electric starter motor 66 having a pinion gear assembly for selective driving engagement with flywheel 44, and a separate start switch 68, such as a push-button switch, and also includes power connector 70 for connection to an external power source, such as a 110 volt AC wall outlet.

The safety key switch 62 and safety key 60 are included in all engines that include an electric starter assembly 64, such as that shown in FIGS. 1 and 2, and are also typically installed in all engines that could be equipped with an electric starter at some time after production, because the safety key switch 62 and safety key 60 are currently required when an electric starter assembly 64 is used on the engine.

In use, safety key 60 must first be inserted into safety key switch 62 for the ignition circuit 48 to be operable. Thereafter, either the manual recoil starter 46 or the electric starter assembly 64 is operated to start engine 22. When electrical starter assembly 64 is used, an electrical cord (not shown) from an external power source is plugged into power connector 70 of starter switch 68, and starter switch 68 is then actuated by the operator, such as via push button 72, to supply electrical power from the external power source to starter motor 66 to engage and crank flywheel 44 of crankshaft 42 for engine starting. After engine 22 starts, the operator releases button 72 of starter switch 68 and then disconnects the power cord from power connector 70. Thereafter, engine 22 is controlled by choke and throttle control assembly 74, which may include a lever actuator, for example.

Although the foregoing starting system has proven to be effective and reliable, the system includes a number of separate parts which must be assembled individually to engine 22 and must be connected to one another via several electrical leads. For example, safety key switch 62 is mounted to the engine housing as a separate component from choke and throttle control assembly 74 of the engine. Additionally, starter switch 68 and power connector 70 are separate from starter motor 66, and each must be separately mounted to engine 22. Furthermore, the safety key portion of the ignition circuit 48 shown in FIG. 2 usually requires extra wires external to the electric starter assembly portion of the circuit. Also, three separate switches are usually required in the configuration shown in FIGS. 1 and 2, including safety key switch 62, engine control switch 58, and a starter switch 68.

What is needed is a starting system for small internal combustion engines which is an improvement over the foregoing.

SUMMARY OF THE INVENTION

The present invention provides an internal combustion engine including an electrical starting system which integrates several components into a single assembly for easier manufacture and operation of the engine. For example, a safety switch and key are integrated with the electric motor starting system. The starting system includes a starter motor having a drive member in selective driving relationship with the engine crankshaft, and also includes a key and a switch assembled to the starter motor. The switch includes a power connector and a key interface, and the key and key interface are together moveable between a first or "insert/remove" position in which the key is selectively engageable and disengageable with the key interface, a second or "run" position in which the key is engaged with the key interface and the power connector is not in electrical communication with the starter motor, and a third or "start" position in which the key is engaged with the key interface and the power connector is in electrical communication with the starter motor.

In one embodiment, the switch, the power connector, and the key interface are disposed within a housing which is mounted directly to the starter motor. The key and the key interface may be configured to be rotatable together between the first, the second, and the third positions, and the switch may include a key biasing element which, when the key and the key interface are in the third position, biases at least one of the key and the key interface toward the second position. The engine further includes an ignition circuit which may include an engine shutdown switch operable to enable and to disable the ignition circuit.

In one form thereof, the present invention provides an internal combustion engine, including a crankshaft; and a starting system, including a starter motor including a drive member in selective driving relationship with the crankshaft; a key; and a switch assembled to the starter motor, the switch including a power connector and a key interface, the key and the key interface together moveable between a first position in which the key is selectively engageable and disengageable with the key interface, and second position in which the key is engaged with the key interface and the power connector is in selective electrical communication with the starter motor.

In another form thereof, the present invention provides an internal combustion engine, including a crankshaft; an ignition circuit including an engine control switch; and a starting system, including a starter motor including a drive member in selective driving relationship with the crankshaft; a power connector connectable to a power source; a key; and a starter control switch including a housing mounted directly to the starter motor and including a key interface, the key selectively engageable and disengageable with the key interface, and the key and the key interface together movable when in engagement to place the starter control switch between a first position in which the power connector is in electrical communication with the starter motor and a second position in which the power connector is not in electrical communication with the starter motor.

In a further form thereof, the present invention provides an internal combustion engine, including a crankshaft; an ignition circuit; and a starting system, including a starter motor including a drive member in selective driving relationship with the crankshaft; a power connector connectable to a power source; a key; and an integrated switch including a starter control switch and an engine control switch, the starter control switch including a housing mounted directly to the starter motor and including a key interface, the starter control switch operable in a first position to provide electrical communication between the power connector and the starter motor and in a second position to prevent electrical communication between the power connector and the starter motor.

In a further form thereof, the present invention provides a starter assembly for a small internal combustion engine, including a starter housing, including an internal wall including a starter button; an external wall spaced from the internal wall and including a key slot, the key slot offset with respect to the starter button; and a key including a flange dimensioned for translational receipt through the key slot in a first orientation, the key after receipt through the key slot thereafter rotatable to engage the flange with the starter button.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 8 is a schematic view of the electrical components of an integrated switch for the starter assembly and ignition circuit;

FIG. 10A is a partial sectional view of a switch assembly according to a still further embodiment; and FIG. 10B is a sectional view through the switch assembly of FIG. 10B.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
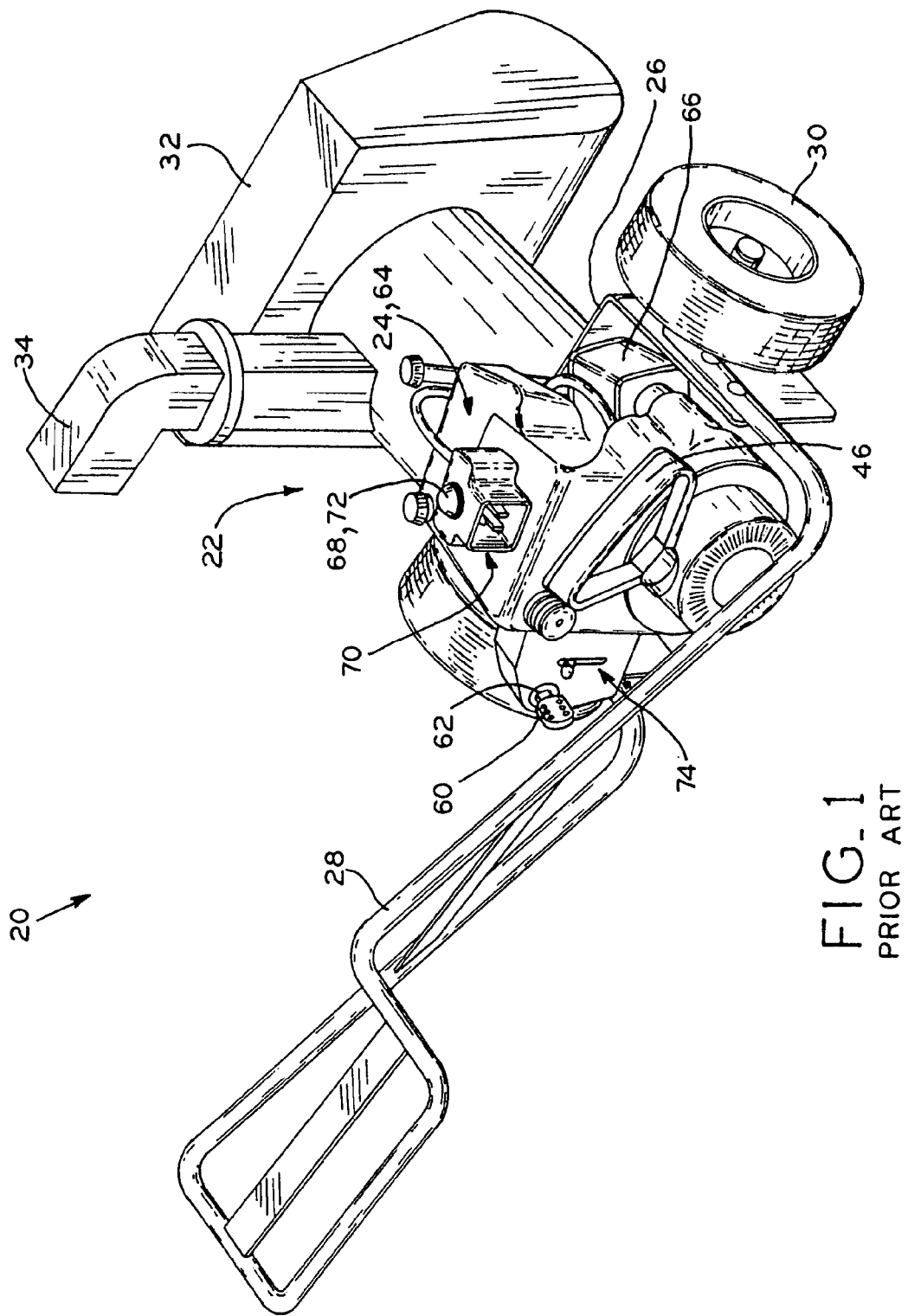
FIG. 1 is a rear perspective view of an exemplary implement, shown as a snow thrower, including a known engine.
Figure 2:
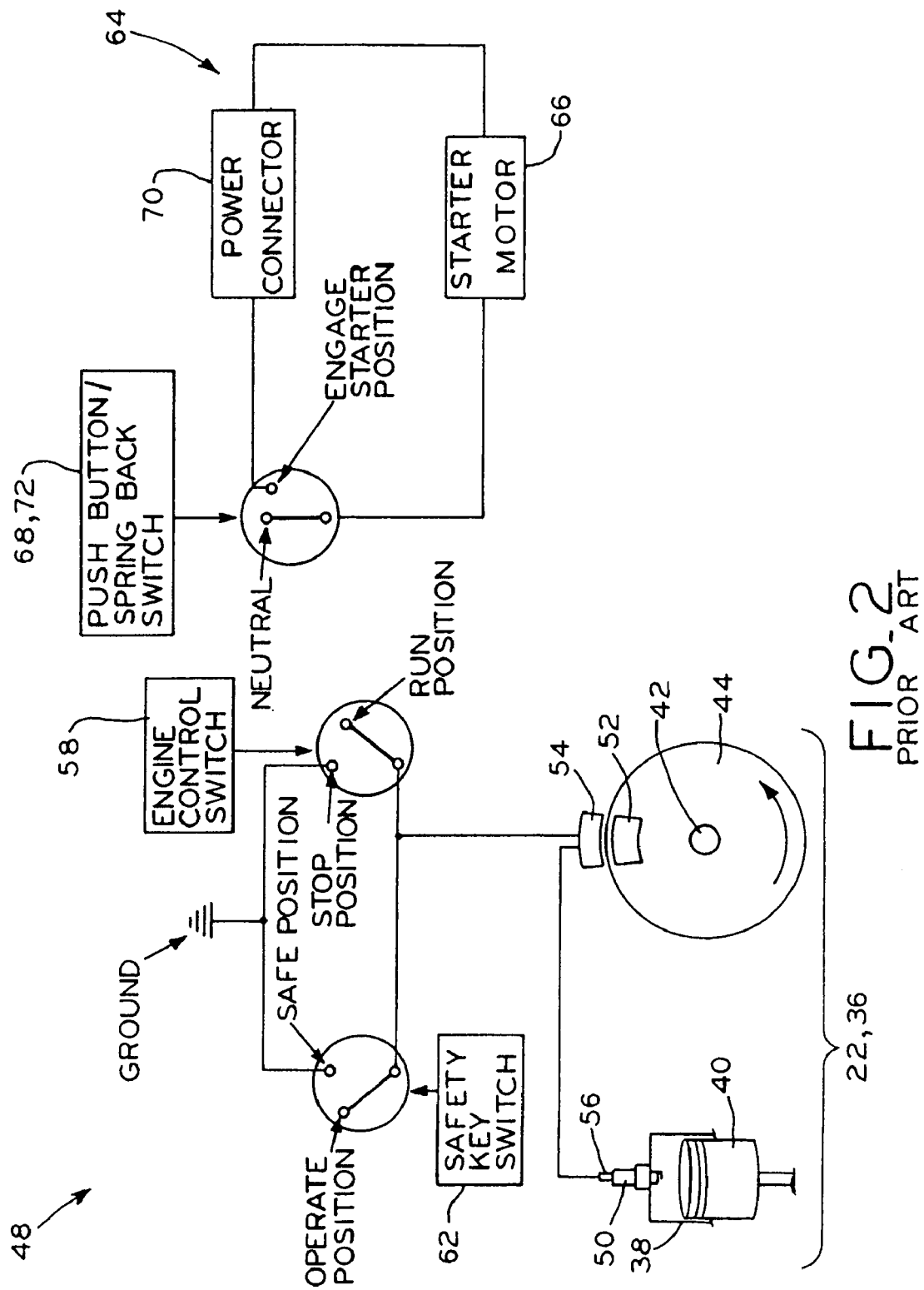
FIG. 2 is a schematic view of electrical components of a starter assembly and ignition circuit of the engine of FIG. 1.
Figure 3:
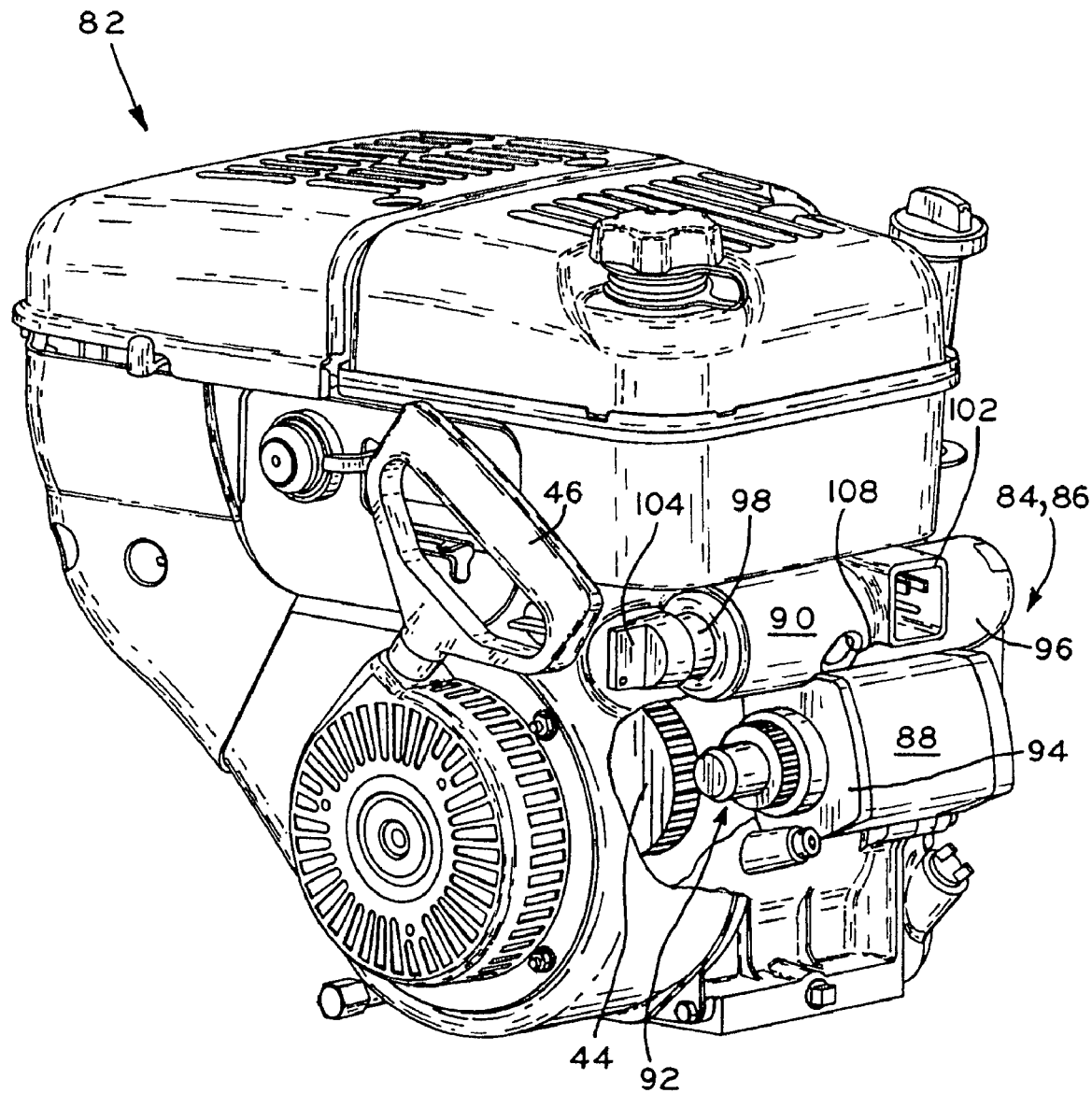
FIG. 3 is a front perspective view of an engine including the starter assembly of the present invention, with a portion of the engine shroud cut away to show components of the starter assembly.

Referring to FIG. 3, an exemplary engine 82 is shown that may include a starting system 84 in accordance with the present invention. Engine 82 is usable with any suitable implement, such as snow thrower 20 shown in FIG. 1, and the same reference numerals are used to designate identical or similar components of engine 22 and engine 82. Although the exemplary implement is shown and described herein as snow thrower 20, engines having a starting system in accordance with the present invention may be used with other implements such as lawn mowers, lawn tractors, generators, and the like. Engine 82 may be either a horizontal or vertical crankshaft engine, and may include one or more cylinders such as, for example, engines manufactured by Tecumseh Power Company of Grafton, Wis.

Referring to FIGS. 3-6, details of the engine starting system 84 of the present invention are shown. Starting system or circuit 84 generally includes a starter motor and switch assembly 86 including starter motor 88 and switch 90. Starter motor 88 may be a small AC or DC electric motor, for example. Motor 88 includes a drive member for selectively engaging and driving flywheel 44, the drive member shown herein as a known, Bendix-type pinion assembly 92 associated with the end cap 94 of the armature of motor 88. When motor 88 is energized, pinion assembly 92 engages flywheel 44 to crank flywheel 44 and crankshaft 42 of engine 82 for starting and, after engine 82 starts and crankshaft 42 and flywheel 44 rotate at high speed, pinion assembly 92 disengages from flywheel 44.

Figure 4:
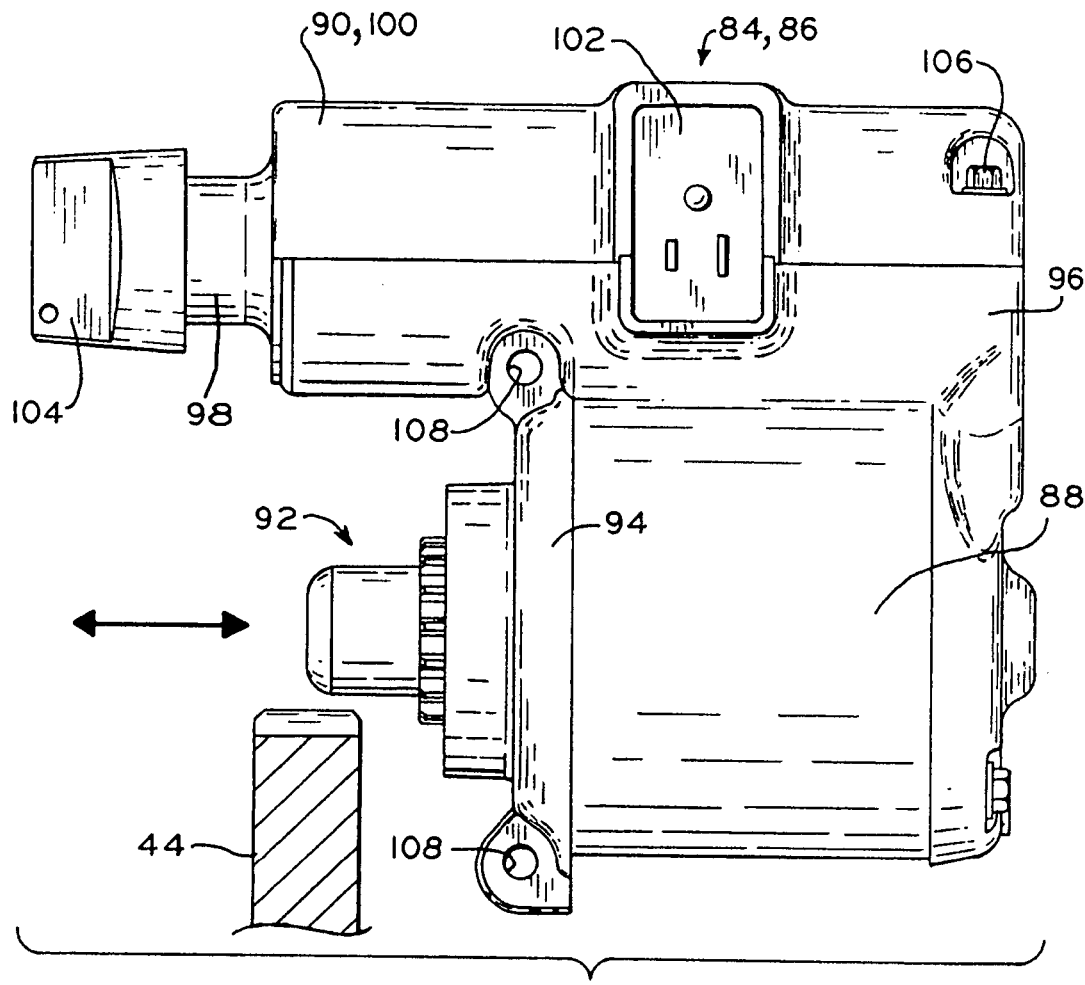
FIG. 4 is a side view of the starter assembly of the engine of FIG. 3, including the key, switch, and starter motor, and further showing a portion of the flywheel of the engine.
Figure 5:
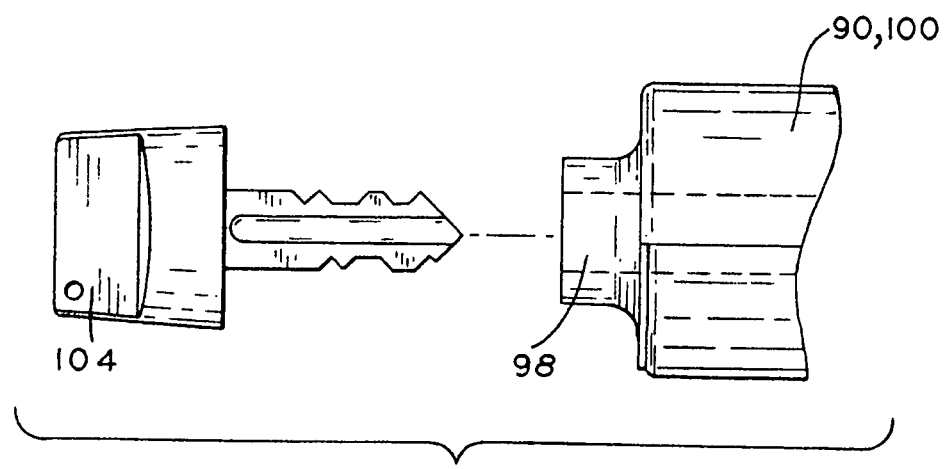
FIG. 5 is an exploded view of a portion of the starter assembly of FIG. 4, further showing the key removed from the starter assembly.

Switch 90 is mounted directly to motor 82 via suitable fasteners, and generally includes housing 96 having key interface 98, switch 100, and power connector 102. Alternatively, switch 90 and motor 82 may be incorporated into a common housing as shown in FIG. 4. Power connector 102 may be an AC-type power connector to which an AC power plug (not shown) of an extension cord, for example, may be connected to supply AC power to assembly 86 from an external source, such as a conventional 110 volt AC power outlet (not shown) or a 220 volt AC power outlet (not shown), for example. Alternatively, power connector 102 may be a DC-type power connector to which a DC power plug (not shown) may be connected to supply power to assembly 86 from an external source, such as a 12 volt DC battery or power supply (not shown) or a 24 volt DC battery or power supply (not shown), for example. Key 104 may have a unique shape which fits key interface 98 and prevents unintended operation of switch 100 by another tool, such as a screwdriver, for example. Several embodiments of the key and key interface are discussed below. Housing 96 may be attached to motor 88 via fasteners 106, thereby coupling together the motor casing and the starter assembly casing. Motor 88 may be attached to engine 82 via suitable fasteners (not shown) inserted through apertures 108 of the motor casing. Thus, a one-step operation may be used to mount both starter assembly housing 96 and motor 88 to engine 82. In one embodiment, housing 96 is integrally formed with motor 88 such as to form a one-piece construction that may be attached as a unitary structure to engine 82.

Figure 6:
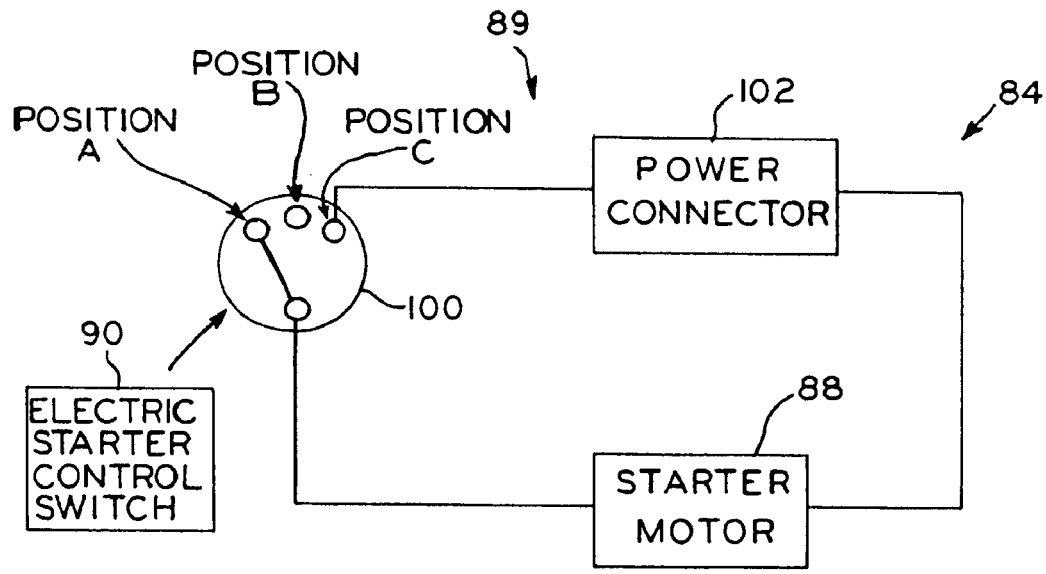
FIG. 6 is a schematic view of the electrical components of the starter assembly.
Figure 7:
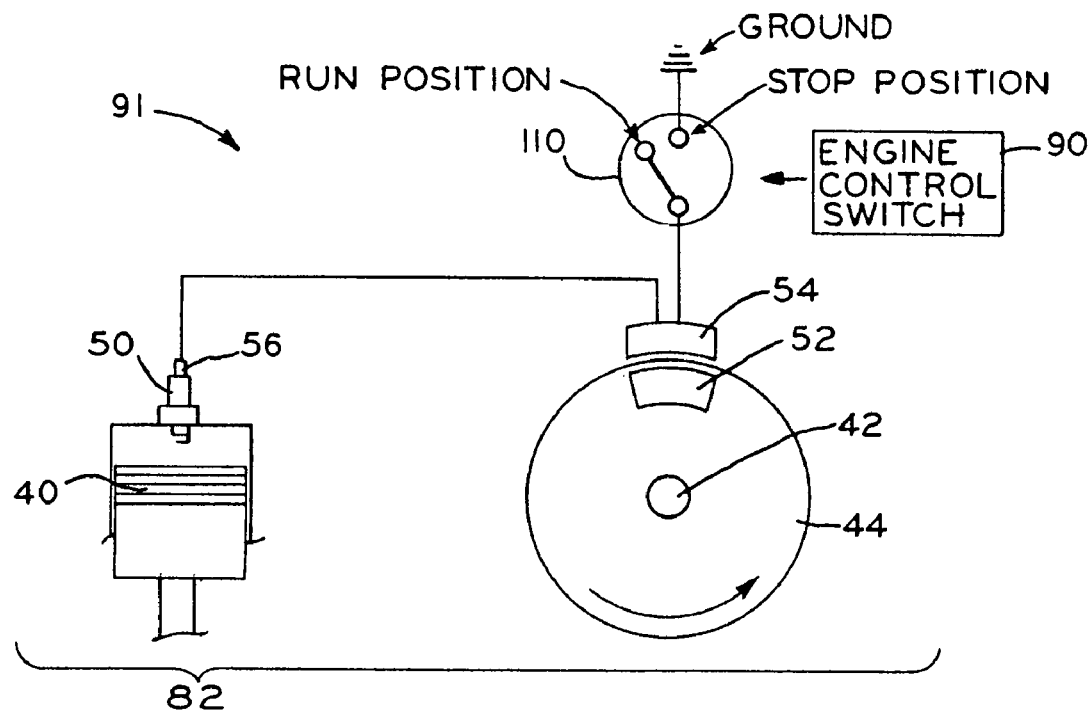
FIG. 7 is a schematic view of the electrical components of the ignition circuit.

In a first exemplary embodiment, as shown in FIGS. 6 and 7, the configuration includes two separate circuits and switches. Specifically, FIG. 6 shows an electric starter circuit 89 and FIG. 7 shows an engine run/stop control circuit 91 which is an independent circuit relative to the electric starter circuit of FIG. 6.

In operation and referring to the first exemplary embodiment of FIGS. 6 and 7, when key 104 is removed from switch 100, circuit 89 is open, and engine 82 cannot be started by electrical starting system 84 but still may be started manually by the recoil starter system. When key 104 is inserted into key interface 98 of switch 100, switch 100 is in a first or "insert/remove" position designated by Position A in FIG. 6. A user may then turn key 104 through a second or "run" position designated by Position B in FIG. 6 to a third or "start" position designated by Position C in FIG. 6, which allows engine 82 to be started by electrical starting system 84 as described below. After the engine 82 starts, the user may turn key 104, or the key 104 may be biased back to, the "run" position, where key 104 remains when engine 82 is running.

To start engine 82 using electrical starting system 84, key 104 is turned from the first or "insert/remove" position (Position A) through the second or "run" position (Position B) to a third or "start" position (Position C) to close circuit 89 between power connector 102 and starter motor 88 to thereby supply electric power to starter motor 88. Upon energization of motor 88, pinion assembly 92 traverses along an axial path denoted by the arrow in FIG. 4 toward flywheel 44 and engages and rotates flywheel 44 to start engine 82. After engine 82 starts and flywheel 44 is rotated at high speed, pinion assembly 92 retracts and disengages from flywheel 44 along the axial path denoted by the arrow in FIG. 4. At this time, the user, after starting engine 82, releases key 104 and allows a return spring (not shown) to rotate and return key 104 to the second or "run" position (Position B) in which key 104 remains during running of the engine. In the second or "run" position (Position B), electrical starter circuit 89 remains open.

To stop engine 82 and referring now to FIG. 7, the user may actuate engine control or speed control switch 110 to temporarily ground ignition circuit 91 to terminate combustion and allow engine 82 to stop. This may be accomplished by switching switch 110 from a "Run position" to a "Stop position" which grounds ignition circuit 91 and prevents operation of engine 82. Thereafter, the user may turn key 104 to the first or "insert/remove" position (Position A) (FIG. 6) and then disengage key 104 from switch 100 such that engine 82 cannot be started using the electrical starter system without key 104.

Advantageously, electric starter assembly 84 provides a compact, unitary starter arrangement which integrates the switch 100, key interface 98, and power connector 102 with the starter motor 88 to provide an assembly that may be manufactured separately from engine 82 as a unit, and thereafter is mounted as a unit to engine 82 during manufacture of engine 82 for ease of assembly and reduced manufacturing costs. Furthermore, electric starter assembly 84 provides a single point of operation for safety key 104 and starter switch 100. Electric starter assembly 84 advantageously allows starter motor 88 to be disabled without disabling ignition circuit 91 of engine 82. Electric starter assembly 84 also advantageously reduces the number of components in assembly and provides a sealed structure or housing 96 to prevent tampering or environmental damage to switch 100, power connector 102, and key interface 98 in electric starter assembly 84.

In a second exemplary embodiment, as shown in FIG. 8, the configuration includes a single circuit 111, which integrates starter circuit 89 and engine control circuit 91. Specifically, FIG. 8 shows an electric starter circuit and an engine run/stop control circuit which are integrated into a single circuit having a single switch to advantageously provide a single point of operation.

Referring now to FIG. 8, an electric starter assembly is shown which incorporates the engine control switch and the electric starter control switch into a single switch. As shown in FIG. 8, switch 112 combines switch 100 of FIG. 6 and switch 110 of FIG. 7 into a single switch location which connects the ground for the overall circuit 111. In operation, when key 104 is removed from switch 112, circuits 89 and 91 are grounded, and engine 82 is therefore rendered inoperative and cannot be started by electrical starting system 84. When key 104 is inserted into key interface 98 of switch 112, switch 112 is in a first or "insert/remove" position designated by Position A in FIG. 8. A user may then turn key 104 to a second or "run" position designated by Position B in FIG. 8, which allows engine 82 to be started by electrical starting system 84 as described below. Optionally, with key 104 inserted into switch 112 in Position B, engine 82 may be manually started by the recoil starter 46 mechanism in a known manner.

To start engine 82 using electrical starting system 84, key 104 is turned from the first or "insert/remove" position (Position A) through the second or "run" position (Position B) to a third or "start" position (Position C) to close circuit 89 between power connector 102 and starter motor 88 to thereby supply electric power to starter motor 88. At this time, the user, after starting engine 82, releases key 104 and allows a return spring (not shown) to rotate and return key 104 to the second or "run" position (Position B) in which key 104 remains during running of engine 82. In the second or "run" position (Position B), electrical starter circuit 89 remains open.

To stop engine 82, the user may actuate the engine control or speed control switch of switch 112 to temporarily ground ignition circuit 91 to terminate combustion and allow the engine to stop. This may be accomplished by switching switch 112 from the "Run position" (Position B) to the "Stop position" (Position A) which grounds ignition circuit 91 and prevents operation of engine 82. Thereafter, the user may disengage key 104 from switch 112 such that engine 82 cannot be started without key 104.

Figure 9A:
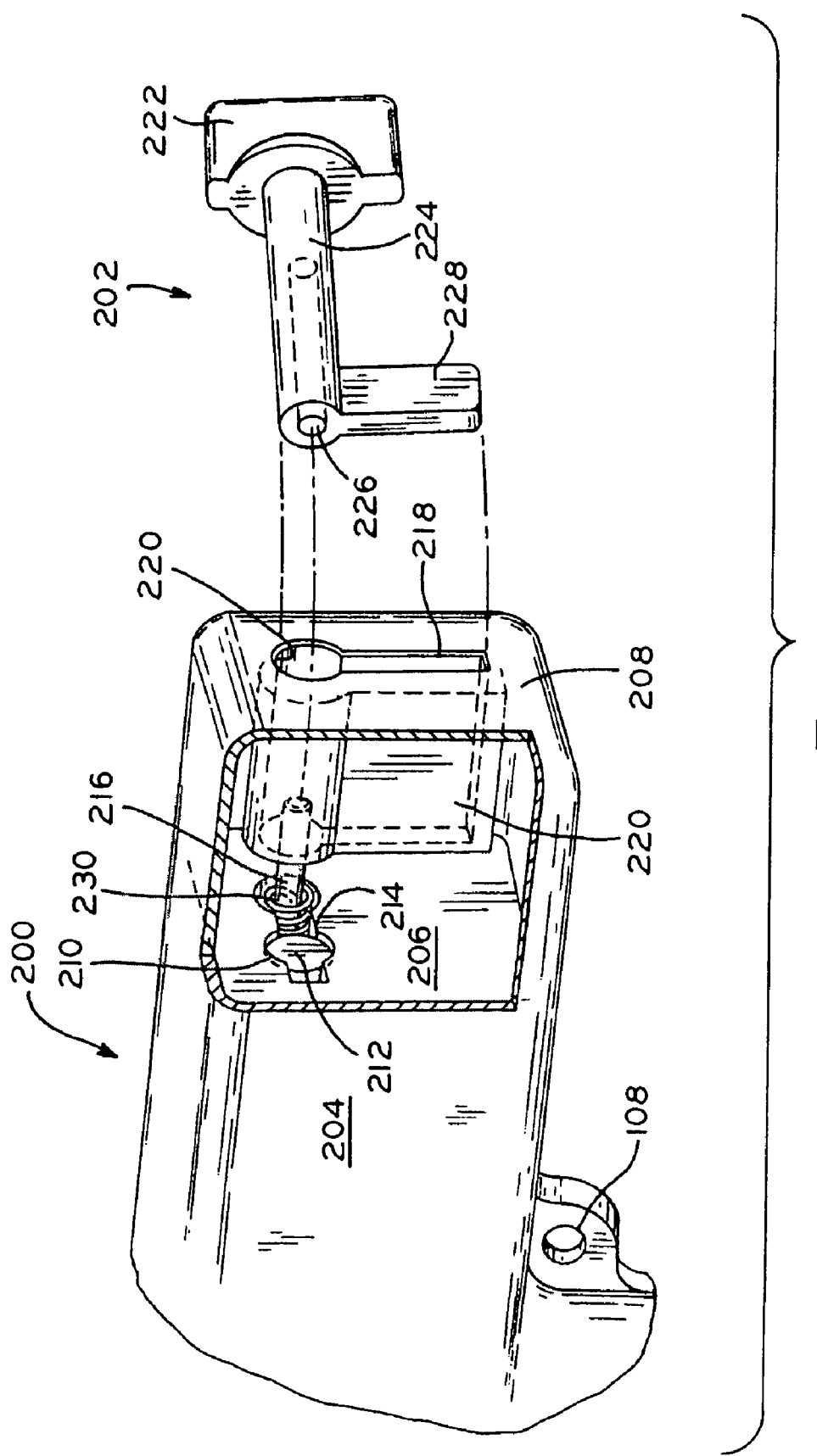
FIG. 9A is a perspective view of a portion of a switch assembly according to a further embodiment, showing a key insertable into the switch.
Figure 9B:
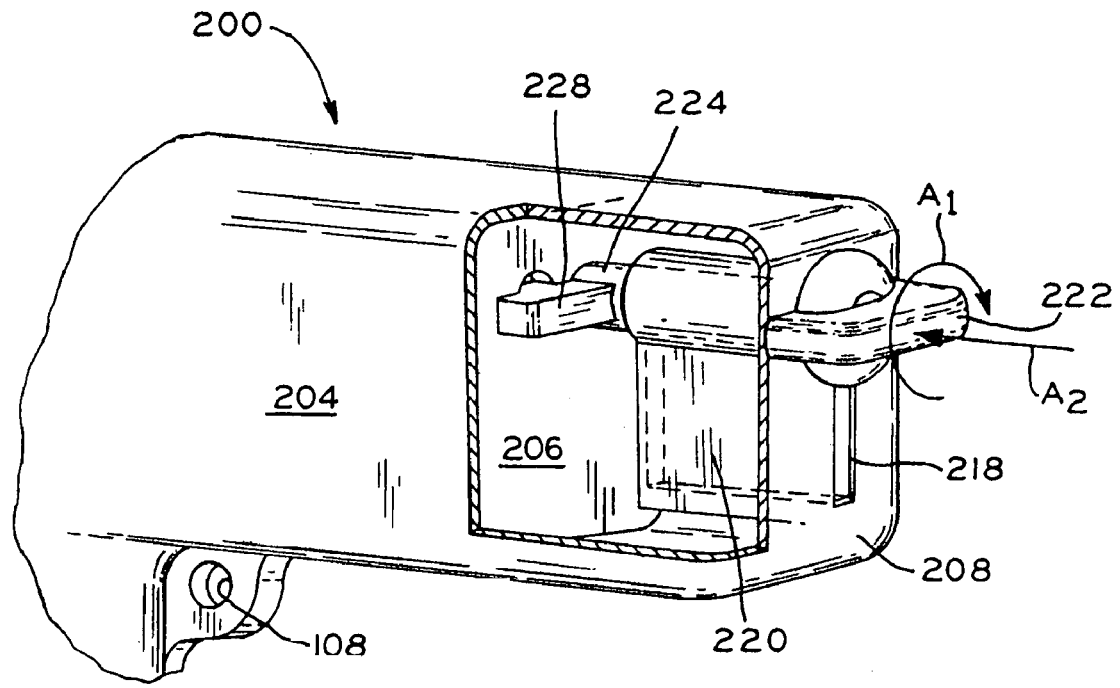
FIG. 9B is another perspective view of a portion of a switch assembly of FIG. 9A, showing the key rotatable to engage the starter button of the switch.

Referring to FIGS. 9A and 9B, an alternate embodiment of switch 100 is shown, designated switch 200, which includes a key 202. Switch 200 includes a switch body 204 having an internal wall, shown as switch button plate 206, and an external wall, shown as switch box cover 208. Switch button plate 206 includes circular opening 210 in which switch button 212 is disposed, as well as a groove 214 extending across opening 210 and button 212. A cylindrical rod 216 extends from groove 214 adjacent opening 210, and is offset from, or spaced from, opening 210. Switch box cover 208 is spaced from switch button plate 206, and includes a vertical slot 218 therein which is contiguous with a cylindrical bore 220 formed within switch box cover 208 itself and within an extension portion 220 extending from switch box cover 208 toward switch button plate 206.

Key 202 includes handle portion 222, as well as shaft portion 224 extending therefrom which terminates in a distal end having a bore 226 corresponding in diameter to the outer diameter of shaft 216. Flange 228 extends radially from shaft and is dimensioned for receipt within slot 218.

In use, switch 200 and key 202 are designed to cooperate with one another such that only key 202 may be used with switch 200 to depress switch button 212 to activate switch 200 for engine starting.

Specifically, referring to FIG. 9A, key 202 is inserted translationally into switch box cover 208 with shaft 224 inserted through hole 220 and flange 228 inserted through slot 218. Key 202 is then pushed inwardly with shaft 216 of switch button 206 received within bore 226 of key 202, with key 202 disposed offset in relation to button 212. As shown in FIG. 9B, when flange 228 of 226 key 202 clears the end of extension portion 220, key 202 may be rotated 90° clockwise as shown by arrow $A_1$ to align flange 228 of key 202 with groove 214. Thereafter, key 202 may be depressed inwardly as shown by arrow $A_2$ against the bias of a spring 230 disposed around shaft 216 to depress switch button 212 to start the engine in the manner described above. After the force used to depress key 202 against button 212 is removed, spring 230 biases key 202 outwardly, which may remain in its rotated position and at least partially engaged with slot 214 during running of the engine. Key 202 may be removed by reversing the foregoing procedure.

Advantageously, switch 200 provides a tamper-proof device in which an unauthorized object, such as a screwdriver, for example, cannot be inserted through hole 220 in switch box cover and engaged with switch button 212 without being blocked by shaft 216.

Figure 9C:
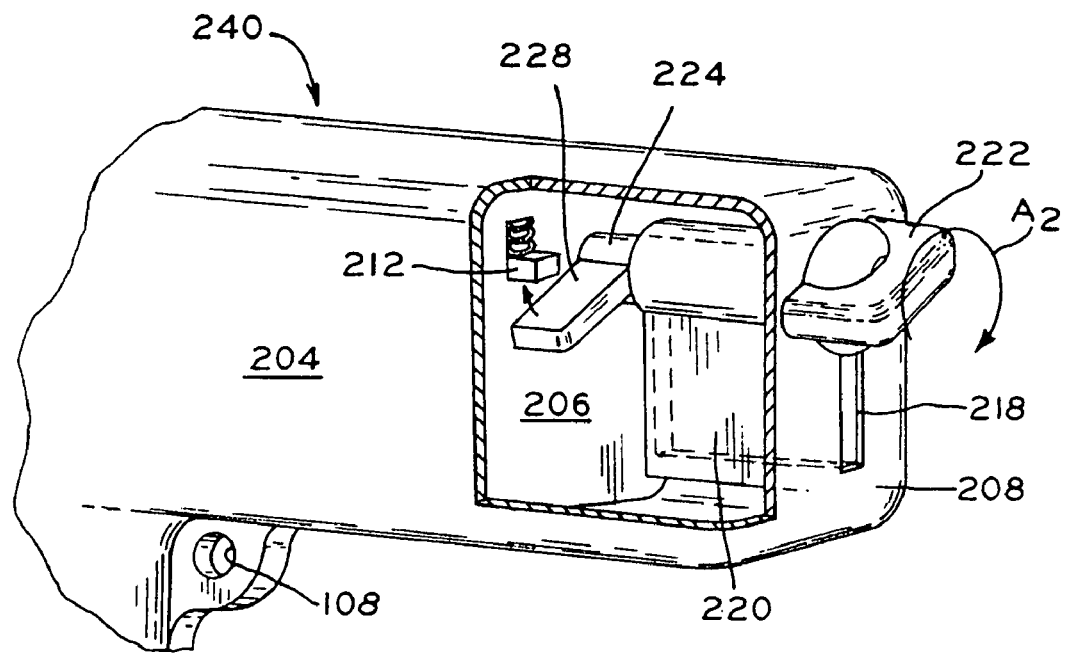
FIG. 9C is a perspective view of a portion of a switch assembly according to a further embodiment.

Referring to FIG. 9C, a slightly modified version of switch 200 is shown as switch 240. Switch 240 and key 202 function identically to switch 200 described above, except that switch button 212 is disposed vertically and may be depressed upwardly by rotating key 202 clockwise to engage flange portion 228 of key 202 with switch button 212 against the bias of spring 216.

Referring to FIGS. 10A and 10B, still another version of switch 200 is shown as switch 250. Switch 250 is somewhat similar to switches 200 and 240 described above, and identical references numerals have been used where applicable to identify identical or substantially identical components therebetween. Switch box cover 208 includes tubular section 252 extending inwardly therefrom toward actuator plate 254, to which actuator 256 is rotatably mounted, such as upon a shaft 258 extending from actuator plate 254. Actuator 256 includes shaft 260, and flange 262 extending radially from shaft 260 and disposed in the clearance space between the end of tubular section 252 of switch box cover 208 and actuator plate 254. O-ring 264 seals the space between shaft 260 and tubular section 252 to prevent moisture from infiltrating into switch 250. The end of shaft 260 includes a projection 266 having a triangular-shaped cross section, or profile. Switch button plate 268 is mounted at a diagonal angle within switch 250, and includes switch button 212. Key 270 includes handle portion 272 with shaft 274 extending therefrom having a recess 276 having a triangular cross section, or profile, corresponding to the shape of projection 266 of shaft 260 of actuator 256. The triangular shapes or profiles of these components may, of course, vary, and may generally include any non-circular shaped profile such that rotation of key 270 rotates shaft 260 of actuator 256, as described below. Of course, in an alternate embodiment, key 270 could have projection 266 and shaft 260 of actuator 256 could have recess 276.

In use, shaft 274 of key 270 is inserted through the opening in tubular section 252 of switch box cover 208, and key 270 is translated inwardly into tubular section 252 in order to engage shaft 274 of key 270 with shaft 260 of actuator 256 and, in particular, to engage the cooperating triangular shaped recess 276 and projection 266 thereof, respectively. Thereafter, rotation of key 270 clockwise in turn rotates actuator 256 against the bias of an optional spring 278 that normally biases actuator 256 to the position shown in FIG. 10B. As shown by the arrow 280 in FIGS. 10A and B, actuator 256 is thereby rotated such that flange 262 of actuator 256 engages switch button 212 to start the engine. After the engine is started and rotational force on key 270 and actuator 256 is release, spring 278 biases actuator 256 and key 270 back to the position shown in FIG. 10B, where same may remain during running of the engine. Advantageously, the mutually-engaging triangular profiles that provide a rotational interlock between key 270 and actuator 256 prevent the use of an unauthorized object other than key 270 to start the engine.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An internal combustion engine, comprising:
a crankcase;
a crankshaft held within the crankcase; and
a starting system, comprising:
a recoil starter being configured to rotate the crankshaft for manually starting the internal combustion engine; and
an electric starting system that includes:
a starter motor including a motor casing and a drive member in selective driving relationship with said crankshaft;
a key; and
a housing defining a volume thereof, at least part of the motor casing being mounted within the volume of the housing;
a power connector mounted in a first opening in the housing and exposing at least two conductive tabs for releasable engagement and electrical conduction with corresponding sockets of a removable power cord, the tabs communicating with conductors extending into the starter motor and being provided within the volume of the housing;
a starter control switch mounted within said housing volume and having contacts connected to at least one conductor of the power connector;
a key interface mounted within said housing volume and accepting the key therein, such that said key and said key interface together are rotatable between a first position in which said key is selectively engageable and disengageable with said key interface, and second position in which said key is engaged with said key interface to operate the starter control switch to controllably connect power from the power connector to the starter motor;
an engine shutdown switch mounted within said housing volume and controlling an engine control circuit for selectively preventing operation of the engine; and
wherein the housing of the electric starting system and recoil starter are separate from each other so that each of (i) the recoil starter, and (ii) the electric starting system is removable from the remainder of the internal combustion engine independently of the other.

2. The engine of claim 1, wherein the engine shutdown switch is provided within an ignition circuit such that the engine shutdown switch is operable to enable and to disable said ignition circuit and wherein both of the starter control and the engine shutdown switches are controlled by way of the key.

3. The engine of claim 1, wherein said key and said key interface are together rotatable between said first and second positions.

4. The engine of claim 1, wherein said switch includes a key biasing element which, when said key and said key interface are in a third position, biases at least one of said key and said key interface toward said second position.

5. The engine of claim 1, wherein said power connector is selected from the group consisting of a 110 volt AC power connector, a 220 volt AC power connector, a 12 volt DC power connector, and a 24 volt DC power connector.

6. The engine of claim 1, wherein the housing of the electric starting system is integrated with the motor casing of the starter motor so that both the starter and housing may be attached as a unitary structure to the internal combustion engine using a mounting hole that extends through the motor casing.

* * * * *